United States Patent
Owens et al.

(10) Patent No.: US 7,562,674 B2
(45) Date of Patent: Jul. 21, 2009

(54) SECURITY ENCLOSURE FOR A CONTROL APPARATUS

(75) Inventors: Mitchell S. Owens, Glendale, AZ (US); Michael T. Wyman, Peoria, AZ (US)

(73) Assignee: Cage-It Enterprises, Inc., Surprise, AZ (US)

( * ) Notice: Subject to any disclaimer, the term of this patent is extended or adjusted under 35 U.S.C. 154(b) by 931 days.

(21) Appl. No.: 10/661,157

(22) Filed: Sep. 11, 2003

(65) Prior Publication Data

US 2005/0056315 A1    Mar. 17, 2005

(51) Int. Cl.
*F16K 27/08* (2006.01)
(52) U.S. Cl. .......................................... 137/382; 70/178
(58) Field of Classification Search ................ 137/382, 137/377; 70/158, 178
See application file for complete search history.

(56) References Cited

U.S. PATENT DOCUMENTS

| | | | | |
|---|---|---|---|---|
| 1,690,461 A | * | 11/1928 | Sieben | ......................... 137/382 |
| 4,026,596 A | * | 5/1977 | Carr | ............................. 410/82 |
| 4,726,394 A | | 2/1988 | Devine | |
| 4,890,638 A | | 1/1990 | Davenport | |
| 4,993,450 A | * | 2/1991 | Dunn | ......................... 137/382 |
| 5,740,832 A | | 4/1998 | Griffin et al. | |
| 5,996,611 A | | 12/1999 | Griffin et al. | |
| 6,021,804 A | | 2/2000 | Griffin et al. | |
| 6,173,733 B1 | | 1/2001 | Pruitt et al. | |
| 6,203,591 B1 | * | 3/2001 | Clements et al. | ........... 55/341.1 |
| 6,206,030 B1 | | 3/2001 | Barthuly | |
| 6,293,301 B1 | | 9/2001 | Griffin et al. | |
| 6,311,720 B1 | | 11/2001 | Griffin et al. | |
| 6,354,116 B1 | | 3/2002 | Drake | |
| 6,532,985 B1 | | 3/2003 | Griffin et al. | |
| 6,561,215 B1 | * | 5/2003 | Wakefield | .................... 137/364 |
| 2001/0018926 A1 | | 9/2001 | Griffin et al. | |
| 2002/0031406 A1 | * | 3/2002 | Vidal et al. | .................. 405/284 |

OTHER PUBLICATIONS

GuardShack Product Line Brochure, Backflow Prevention Device InnClosures, Printed in 2000.

* cited by examiner

*Primary Examiner*—Gregory L Huson
*Assistant Examiner*—Craig M Schneider
(74) *Attorney, Agent, or Firm*—Jordan M. Meschkow; Lowell W. Gresham; Gouri G. Nair

(57) ABSTRACT

A security enclosure (20) for a control apparatus (22) is disclosed. The enclosure (20) is formed of a cage (28) connected to a base (30). Opposing mounting straps (36) partially embedded within the base (30) extend inside the cage (28) through strap engagement slots (58). The cage (28) has cage lock holes (72) that align with strap lock holes (70) in the mounting straps (36), and through which a lock device (74) is passed to secure the cage (28) to the mounting straps (36) and the base (30). The shackle (86) of a lock (88) is passed through a hole (82) in a movable lock tab (78) on the lock device (74) and a hole (84) in a fixed lock tab (80) affixed to the cage (28). When the lock (88) is closed, the lock device (74) is secured and the cage (28) cannot be removed from the base (30) without opening the lock (88). The lock (88) and the lock tabs (78,80) are protected by a shroud (90) affixed to the cage (28). End panels (26) and a perforated body panel (24) complete the cage (28).

10 Claims, 7 Drawing Sheets

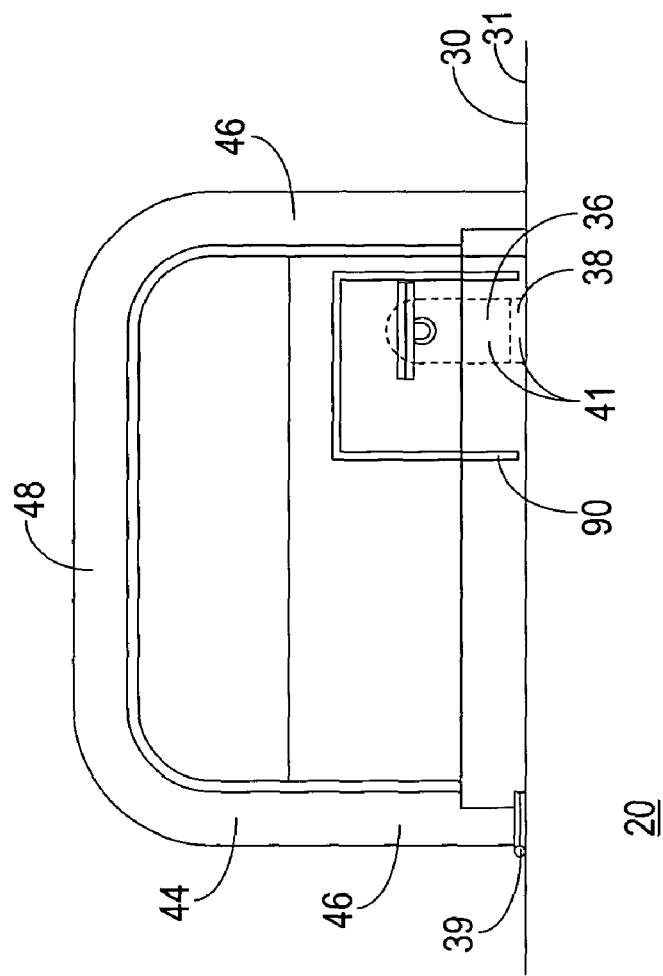
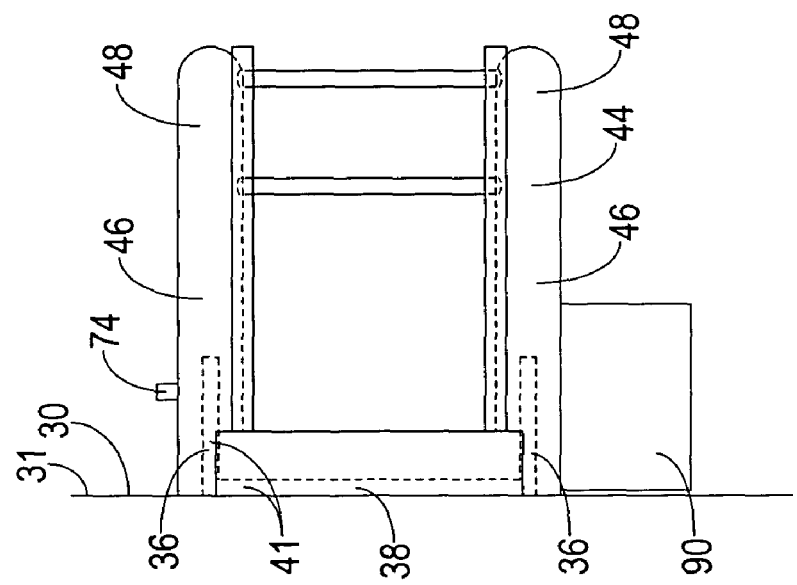

SECURITY ENCLOSURE FOR A CONTROL APPARATUS

TECHNICAL FIELD OF THE INVENTION

The present invention relates to the field of enclosures for control apparatuses. More specifically, the present invention relates to the field of tamper-resistant security enclosures for control apparatuses.

BACKGROUND OF THE INVENTION

Backflow prevention assemblies, vacuum relief valves, clocks, flow meters, and other fluid-control apparatuses are typically used to control landscape systems in parks, commercial and scholastic campuses, resorts and golf courses, and other landscaped areas. Several problems arise where such apparatuses are used.

Injury is one such problem. Individuals using a landscaped area may inadvertently trip over or run into a fluid-control apparatus, leading to possible injury and potential liability. Because of this, an enclosure is typically placed around the fluid-control apparatus. The enclosure is larger than the apparatus it encloses, and is therefore more visible. In addition, a further increase in visibility is often achieved by painting the enclosure a color having a marked contrast to the surrounding area, e.g., a tan enclosure on a green lawn. Such an increase in visibility reduces the potential for injury and therefore decreases liability.

Many such enclosures are right parallelepipeds, i.e., rectangular boxes. Such enclosures have edges and vertices that pose an injury hazard. The very shape of such an enclosure leads to possible injury and potential liability. These enclosures are especially hazardous when used in parks or other places where children may play, as that play may include climbing upon the enclosures.

Another problem encountered with fluid-control apparatuses is theft. Since the apparatuses are often made of copper and/or brass, they have considerable intrinsic value. Suitable enclosures are used to protect such apparatuses from those who would engage in "urban mining," i.e., the theft of copper and brass fittings for sale as scrap.

A related problem is vandalism, i.e., the destruction or damage of the apparatuses without overt gain. This problem is especially problematical with timing apparatuses and other delicate apparatuses. Again, suitable enclosures are used to protect such apparatuses.

To provide adequate protection against vandalism and/or theft, the enclosures must be robust. That is, the enclosures must themselves be capable of withstanding an attack. To this end, the enclosures are typically large and made of steel or other suitably strong material.

Many such enclosures, while somewhat robust, nevertheless have undesirable weaknesses. These weaknesses become known to those who engage in theft and/or vandalism. An experienced attacker would therefore concentrate his/her efforts on an enclosure's weaknesses, bypassing its strengths.

One such potential weakness may be the method of attaching the materials of which the enclosure is formed. For example, some enclosures are formed of sheet materials fastened over a frame, typically by welding. Once the sheet material is breached, say by using a crowbar between welds to pry up a corner or edge, the sheet material may be peeled back and removed relatively quickly.

Another such potential weakness may be the material itself. For example, some encloses have surfaces formed of expanded steel. While proof against a casual attack, such expanded steel is not proof against cutters and similar tools.

A third such potential weakness may be the method by which the enclosure is secured. Many such enclosures are secured to a concrete pad. For example, an enclosure secured to a pad by bolts and nuts may be unbolted by application of a suitable wrench if the bolt head or nut is accessible. Those secured by lag bolts and anchors may simply be pried free through the use of a good crowbar. Even cast-in or epoxied-in bolts may be snapped free by use of a cold chisel and hammer.

Locks form another potential weakness. When the lock is exposed, then the shackle and staple are vulnerable to attack by a bolt cutter. In addition, many conventional padlocks may also be smashed open by a heavy hammer, or split open by a cold chisel.

Another potential weakness has to do with the basic construction of the enclosure. Many such enclosures fail a determined attack because they lack adequate bracing or other structural enhancements. For example, an enclosure formed of an expanded metal housing over a frame, but lacking an interior brace to support the expanded metal housing, may fail if a large attacker were to repetitively kick or stomp on the expanded metal housing. Such activity may well cause the housing to collapse inward to the point where the enclosed apparatus is no longer protected.

SUMMARY OF THE INVENTION

Accordingly, it is an advantage of the present invention that a security enclosure for a fluid-control apparatus is provided.

It is another advantage of the present invention that the security enclosure is configured to have no sharp edges or vertices that may provide a source of injury.

It is another advantage of the present invention that the security enclosure includes a protected technique for fastening the enclosure to a base.

It is another advantage of the present invention that the security enclosure incorporates internal bracing to support a perforated sheet-metal body panel from collapse under impact.

It is another advantage of the present invention that the security enclosure includes a fully shrouded locking assembly to restrict access to a lock and locking mechanism.

The above and other advantages of the present invention are carried out in one form by a security enclosure for a fluid-control apparatus, wherein the enclosure is made up of a cage configured to connect to a base and encompass the apparatus, a mounting strap configured to extend substantially vertically inside the cage when the cage is connected to the base, and a lock device configured to secure the cage to the mounting strap when the cage is connected to the base.

The above and other advantages of the present invention are carried out in another form by a security enclosure for a fluid-control apparatus, wherein the enclosure is a cage configured to connect to a base and encompass the apparatus, a fixed lock tab affixed to the cage and having a tab hole, a lock device formed of a movable lock tab having a tab hole and a lock rod coupled to the movable lock tab, and a shroud configured to enshroud, in conjunction with the base, the fixed lock tab, the movable lock tab, and a lock having a shackle passing through the fixed and movable tab holes when the cage is connected to the base.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 6 depicts an end view of a vertically-mounted security enclosure with body and end panels removed in accordance with another preferred embodiment of the present invention;

FIG. 7 depicts a face view of the vertically-mounted security enclosure of FIG. 5 with body and end panels removed in accordance with another preferred embodiment of the present invention;

DETAILED DESCRIPTION OF THE PREFERRED EMBODIMENTS

Figure 1:
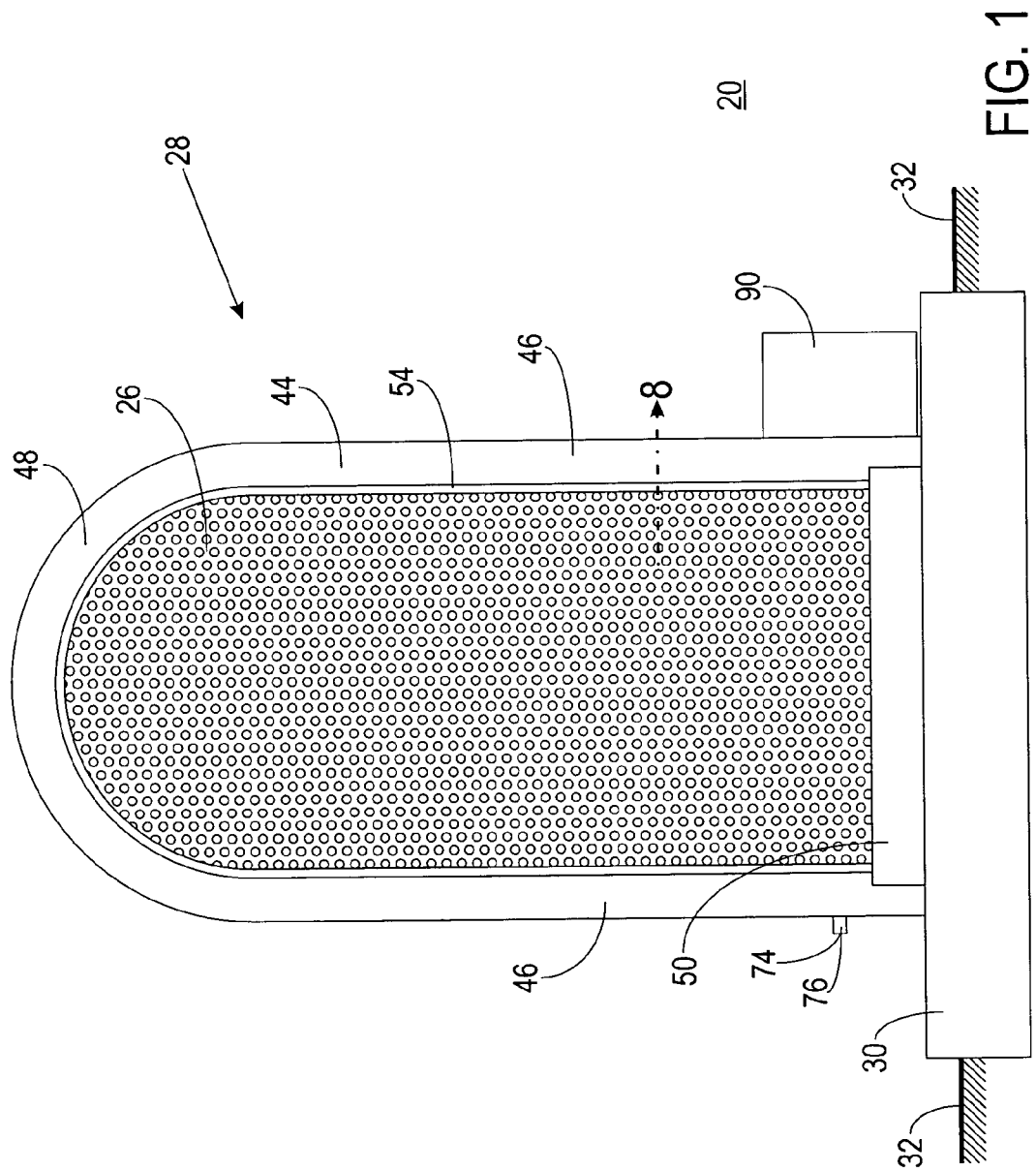
FIG. 1 depicts an end view of a security enclosure in accordance with a preferred embodiment of the present invention.
Figure 2:
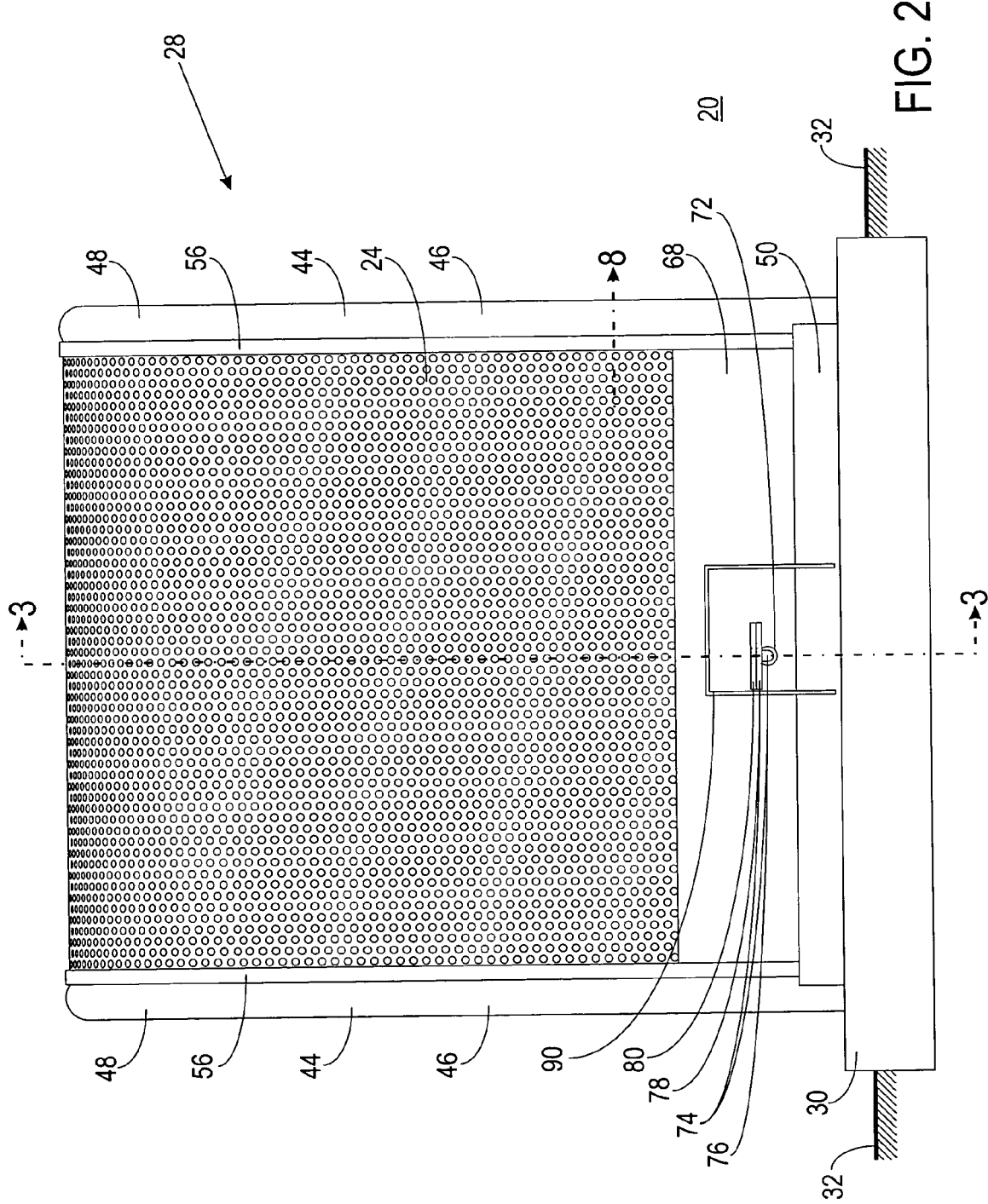
FIG. 2 depicts a face view of the security enclosure of FIG. 1 in accordance with a preferred embodiment of the present invention.
Figure 3:
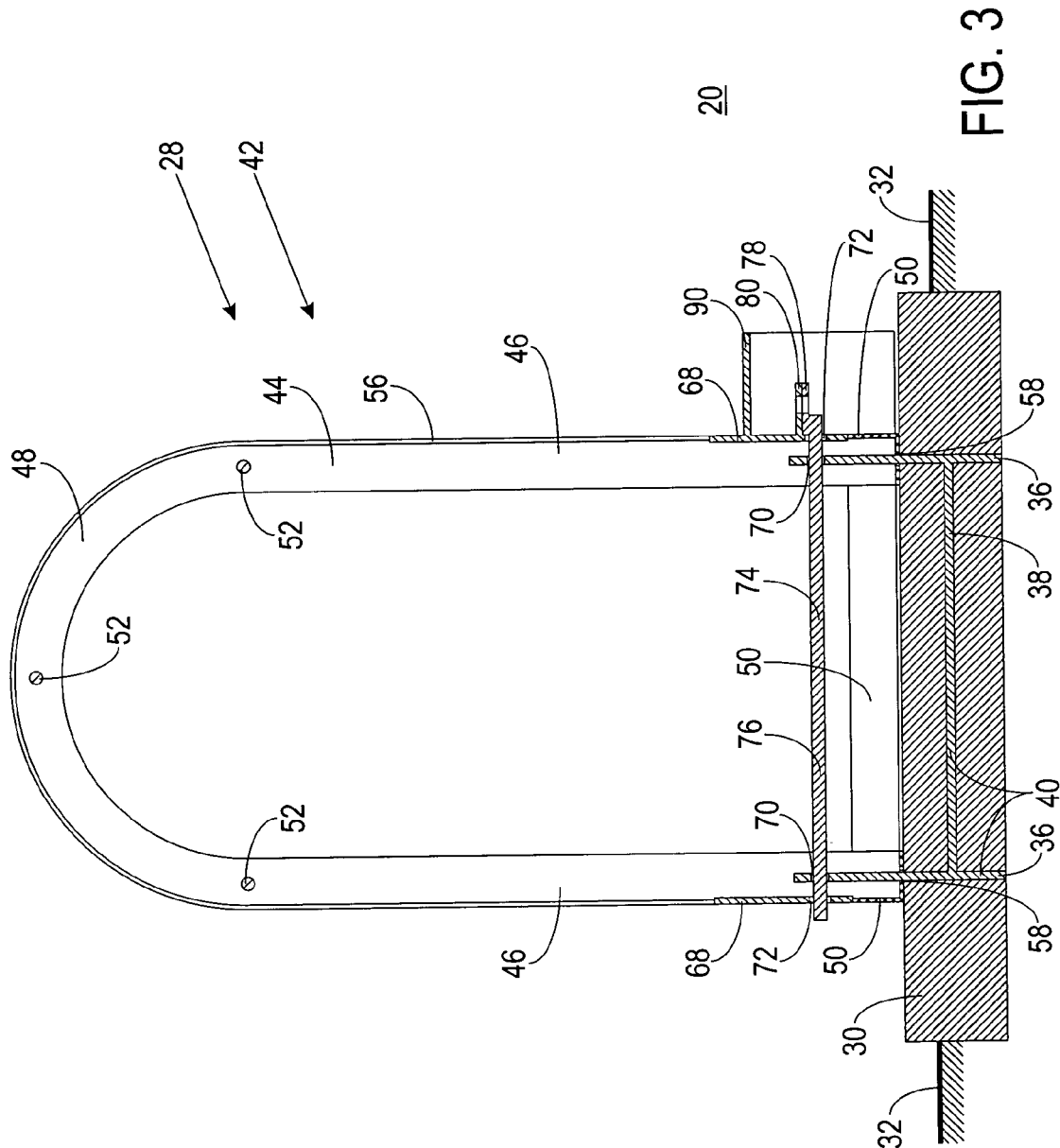
FIG. 3 depicts a cross-sectional end view of the security enclosure of FIGS. 1 and 2 taken at line 3-3 of FIG. 2, but with body and end panels removed in accordance with a preferred embodiment of the present invention.
Figure 4:
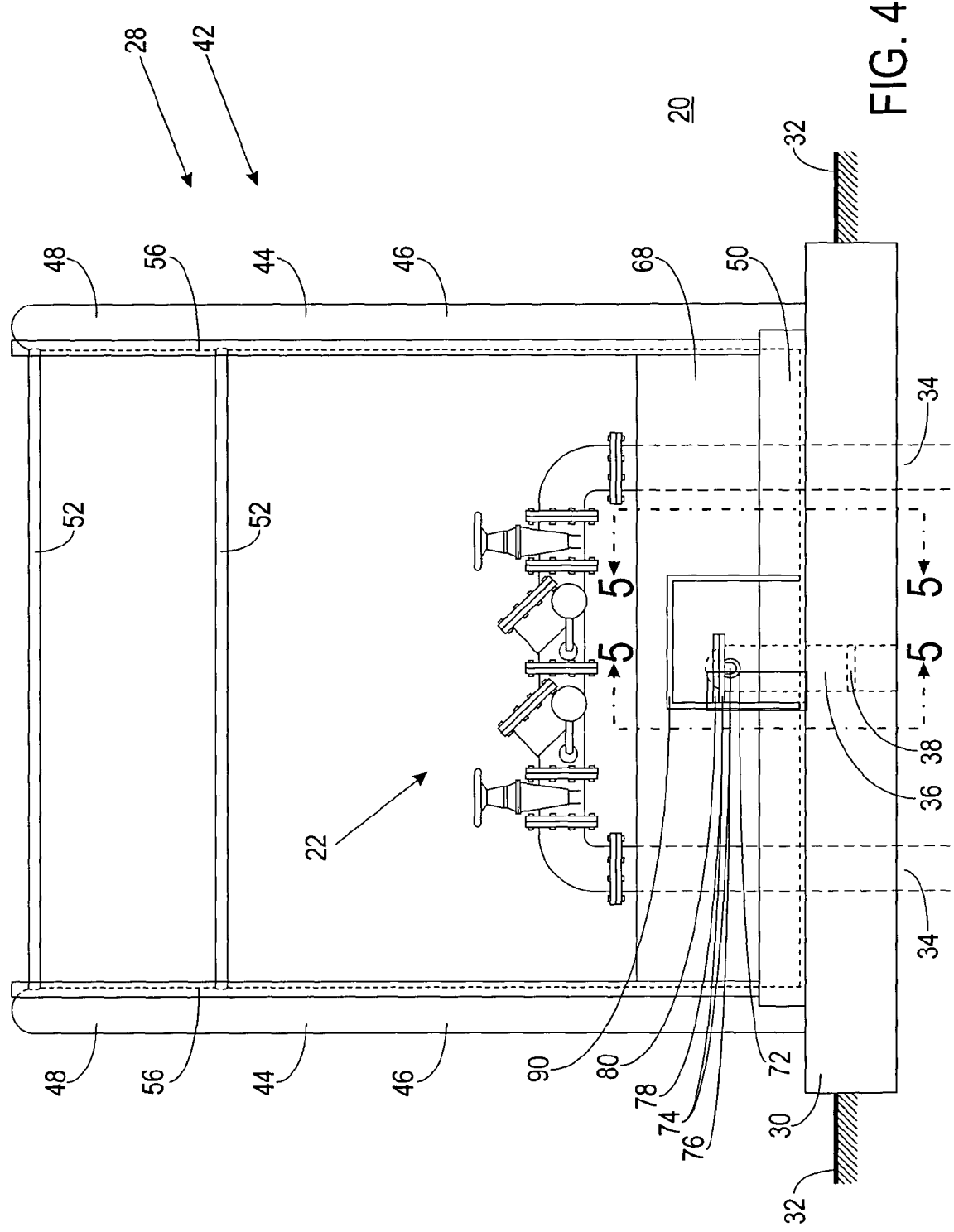
FIG. 4 depicts a face view of the security enclosure of FIGS. 1 and 2 with body and end panels removed demonstrating, among other things, apparatus encompassment in accordance with a preferred embodiment of the present invention.
Figure 5:
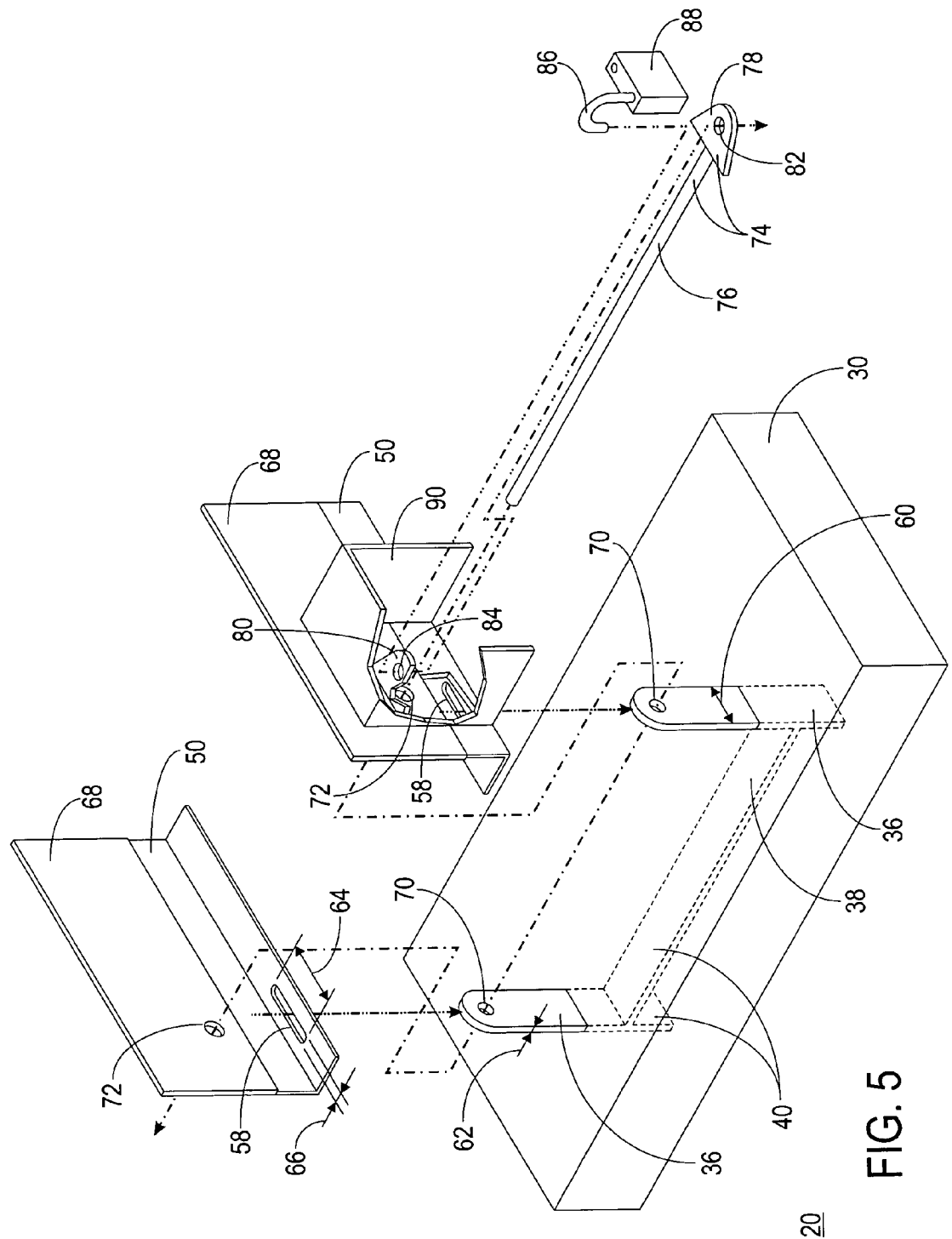
FIG. 5 depicts an exploded isometric view of a portion of the security enclosure of FIGS. 1 and 2 taken between lines 5-5 of FIG. 4 and demonstrating, among other things, locking component engagement in accordance with a preferred embodiment of the present invention.

FIGS. 1 and 2 depict end and face views, respectively, of a security enclosure 20 in accordance with a preferred embodiment of the present invention. FIGS. 3 and 4 depict cross-sectional end and face views, respectively, of enclosure 20 with body panel 24 and end panels 26 removed demonstrating construction of enclosure 20 and encompassment of an apparatus 22. FIG. 3 is taken at line 3-3 of FIG. 2. FIG. 5 depicts an exploded isometric view of a portion of security enclosure 20 taken between lines 5-5 of FIG. 4 and demonstrating, among other things, locking component engagement. The following discussion refers to FIGS. 1 through 5.

Security enclosure 20 is a high-strength, attack-resistant enclosure intended to encompass a control or other apparatus 22 (FIG. 4), such as backflow prevention assemblies, vacuum relief valves, clocks, flow meters, and other fluid-control apparatuses. It is the task of enclosure 20 to protect apparatus 22 from theft or vandalism. While it is recognized that no enclosure can provide absolute protection, enclosure 20 provides a significant deterrent.

Enclosure 20 is made up of a cage 28 secured to a base 30. In the preferred embodiment, enclose 20 is configured to be ground set, i.e., the open "bottom" of enclosure 20 is substantially horizontal, as though resting upon the ground. When enclosure is configured to be ground set, base 30 is typically a cast concrete pad residing upon the Earth 32 and configured to surround and secure piping 34 (FIG. 4) leading to and from apparatus 22. It will be appreciated by those skilled in the art that a ground-set configuration of enclosure 20 is not a requirement of the present invention, and that other configurations are possible without departing from the spirit of the present invention.

Two opposing mounting straps 36 are affixed to base 30, and extend substantially perpendicularly outwards from base 30 into opposing sides of cage 28. Cage 28 is secured to base 30 via mounting straps 36 in a manner discussed hereinafter.

Mounting straps 36 are joined by a mounting shank 38, which is securely coupled to base 30. In the preferred embodiment, in which enclosure 20 is configured to be ground set, base 30 is desirably a cast-in-place concrete pad. This allows mounting straps 36 and mounting shank 38 to form an "H" mounting member 40 configured to sit level upon the Earth 32 prior to the casting of base 30. If "H" mounting member 40 is properly positioned and leveled, then when base 30 is cast, mounting shank 38 will be completely cast within base 30, and mounting straps 36 will extend from base 30 the proper amount and at the proper locations.

FIG. 6 depicts an end view of a vertically-mounted security enclosure 20 with body and end panels 24 and 26 removed in accordance with an alternative preferred embodiment of the present invention. FIG. 7 depicts a "face" view of the security enclosure 20 of FIG. 6 viewed upward from underneath. The following discussion refers to FIGS. 3, 4, 6, and 7.

In an alternative embodiment, base 30 may be a pre-existing vertical surface 31, such as a wall. In this embodiment, mounting straps 36 are substantially perpendicularly coupled to mounting shank 38 to form "U" mounting member 41. The use of "U" mounting member 41 allows mounting shank 38 to be firmly affixed to vertical surface 31, thereby properly positioning and orienting mounting straps 36. When enclosure 20 is small enough, as when encompassing a clock or other small apparatus 22, "U" mounting member 41 may be augmented by the use of a hinge 39.

It is most desirable when using the embodiment of FIGS. 6 and 7 that care be taken to inhibit the ability of a thief or vandal to successfully attack enclosure 20. For this reason, it is desirable, but not a requirement, that "U" mounting member 41 and hinge 39 (if used) be configured to allow the "bottom" of cage 28 to rest substantially flush with vertical surface 31. This may be accomplished by configuring cage 28 so that "U" mounting member 41 and hinge 39 are recessed into cage 28 (shown), or are recessed into surface 31 (not shown). Alternatively, cage 28 may be provided with additional skirting (not shown) which may be used to eliminate any gap between the "bottom" of cage 28 and surface 31.

Most typically, the embodiment of FIGS. 6 and 7 is used to mount enclosure 20 to a wall or other vertical surface 31. It will be understood, however, that this embodiment may be used whenever enclosure 20 is to be retrofitted to an already existing base 30, including previously cast concrete pads.

It will also be understood that the embodiment of FIGS. 6 and 7 is not a requirement where base 30 is vertical surface 31. For example, if base 30 is to be a wall not yet fabricated, then that wall may be built so as to have "H" mounting member 40 embedded therein, thereby permitting the use of the embodiment of FIGS. 1 through 5.

The following discussion refers to FIGS. 1 through 5.

The use of "H" mounting member 40 and mounting straps 36 to couple cage 28 to base 30 avoids the necessity of fastening bolts, brackets, or other components to base 30. Since "H" mounting member 40 is embedded within base 30 (i.e., base 30 is cast around "H" mounting member 40), the integrity of base 30 remains undisturbed. This adds to the overall strength of base 30 and increases the security with which cage 28 is coupled to base 30.

Cage 28 contains a frame 42 to which are attached two opposing end panels 26 and body panel 24. Frame 42 is formed of two opposing "U" members 44. While not a requirement of the present invention, each "U" member 44 is desirably formed of a single bent pipe. "U" members 44 provide a basic "cornerless" shape to enclosure 20, thereby significantly reducing the potential for serious injury should an individual (such as a child) fall against enclosure 20. In the preferred embodiment, "U" members 44 are formed from 1-½" diameter steel pipe.

Each "U" member 44 has two upright portions 46 or "legs" extending from a single "U" portion 48 substantially perpendicularly to base 30. Angle members 50 are coupled between each pair of adjacent upright portions 46 to form a substantially rectangular "bottom" for cage 28. In the preferred embodiment, angle members 50 are 1-½" by 1-½" steel angle bars approximately ⅛" thick and having ends conformed and welded to upright portions 46. Those skilled in the art will appreciate that other forms and attachment methods for angle members 50 may be used without departing from the spirit of the present invention.

Frame 42 has at least one brace 52 extending between "U" members 44. Brace 52 provides strength to the "upper" portion of cage 28 (i.e., that portion farthest from base 30), and inhibits collapse of body panel 24 under impact (discussed in more detail hereinafter). In the preferred embodiment, there are three such braces 52: one brace 52 proximate the center of "U" portion 48, and one brace 52 proximate the junction of "U" portion 48 with each upright portion 46. Those skilled in the art will appreciate that the number and positions of braces 52 may be varied without departing from the spirit of the present invention.

Figure 8:
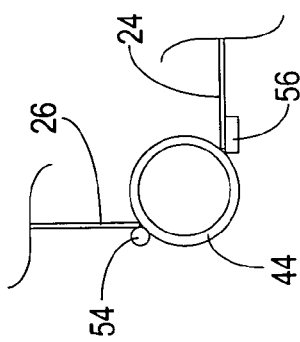
FIG. 8 depicts a cross-sectional slice view of a "U" member taken at lines 8 of FIGS. 1 and 2 and demonstrating banding and panel attachment in accordance with an alternative preferred embodiment of the present invention.

FIG. 8 depicts a cross-sectional slice view of a single "U" member 44 taken at line "8" in FIGS. 1 and 2 and demonstrating banding and panel attachment in accordance with an alternative preferred embodiment of the present invention. The following discussion refers to FIGS. 1 through 5 and 8.

End panel 26 is affixed within each "U" member 44 of frame 42. For strength and security, a banding or bead 54 is affixed to "U" member 44, with end panel 26 affixed within banding 54. In the preferred embodiment, banding 54 is a steel rod formed to the appropriate shape and welded to "U" member 44. End panel 26 is in turn welded to both "U" member 44 and banding 54.

Similarly, body panel 24 is affixed between "U" members 44. Again, for strength and security, a banding 56 is affixed to each "U" member 44, with body panel 24 affixed between "U" members 44 and within banding 56. In the preferred embodiment, for each "U" member 44, banding 56 is a steel strap formed to the appropriate shape and welded to "U" member 44. Body panel 24 is in turn welded to both "U" member 44 and banding 56.

Desirably, body panel 24 is affixed to "U" members 44 so as to pass over braces 52. This allows braces 52 to provide additional support to body panel 24 from the inside. This additional support severely inhibits the deformation of body panel 24 from external impact, thereby providing increased security for apparatus 22.

In order to both provide security and allow ventilation for apparatus 22 when encompassed within enclosure 20, body panel 24 is formed of perforated sheet metal of between 18 and 10 gauge. By being perforated, body panel allows visual inspection of apparatus 22 without necessitating the removal of cage 28. This is a singular advantage when apparatus 22 is a meter or other device that must be read. In the preferred embodiment, body panel 24 and end panels 26 are all formed of 14 gauge perforated sheet steel.

Those skilled in the art will appreciate that the methods of assembly discussed hereinbefore are exemplary only of the preferred embodiment. Other methods of assembly, well known to those skilled in the art, may be used without departing from the spirit of the present invention.

The following discussion refers to FIGS. 1 through 5.

Since angle members 50 are coupled between each pair of adjacent upright portions 46 of "U" members 44, then one angle member 50 is coupled between the two upright portions 46 of each "U" member 44, and two angle 50 members are coupled between one upright portion 46 of each of the two "U" members 44. This provides frame 42 with two pairs of substantially parallel opposing angle members 50. In each angle member 50 of one such pair there exists a strap engagement slot 58. When cage 28 is connected to base 30 and encompasses apparatus 22, mounting straps 36 extend into cage 28 through strap engagement slots 58.

Mounting straps 36 have a strap width 60 and a strap thickness 62. In the preferred embodiment, mounting strap 36 is formed of a 2" by ¼" steel bar, i.e., strap width 60 is 2" and strap thickness 62 is ¼". Those skilled in the art will appreciate that other widths and thicknesses may be used for mounting strap 36 without departing from the spirit of the present invention.

In order that cage 28 may readily be connected to and removed from base 30, i.e., that mounting straps 36 may freely extend through strap engagement slots 58, strap engagement slots 58 each have a slot width 64 greater than strap width 60 and a slot thickness 66 greater than strap thickness 62. In the preferred embodiment, strap engagement slot 58 has a slot width 64 of nominally 2-¼" and a slot thickness 66 of nominally ⅜". Those skilled in the art will appreciate that other dimensions for mounting straps 36 and strap engagement slots 58 may be used without departing from the spirit of the present invention.

A lock plate 68 is affixed between each angle member 50 having strap engagement slot 58 and either body panel 24 or end panel 26. Lock plates 68 are also affixed to upright portions 46 of the respective "U" member(s) 44. Lock plates 68 provide strength for the locking mechanism (discussed hereinafter) and increase security for apparatus 22

In the preferred embodiment depicted in the Figures, strap engagement slots 58 are in the pair of opposing angle members 50 affixed between "U" members 44. In this embodiment, each lock plate 68 is affixed to each of those angle members 50, to body panel 24, and to one upright portion 46 of each "U" member 44.

Figure 9:
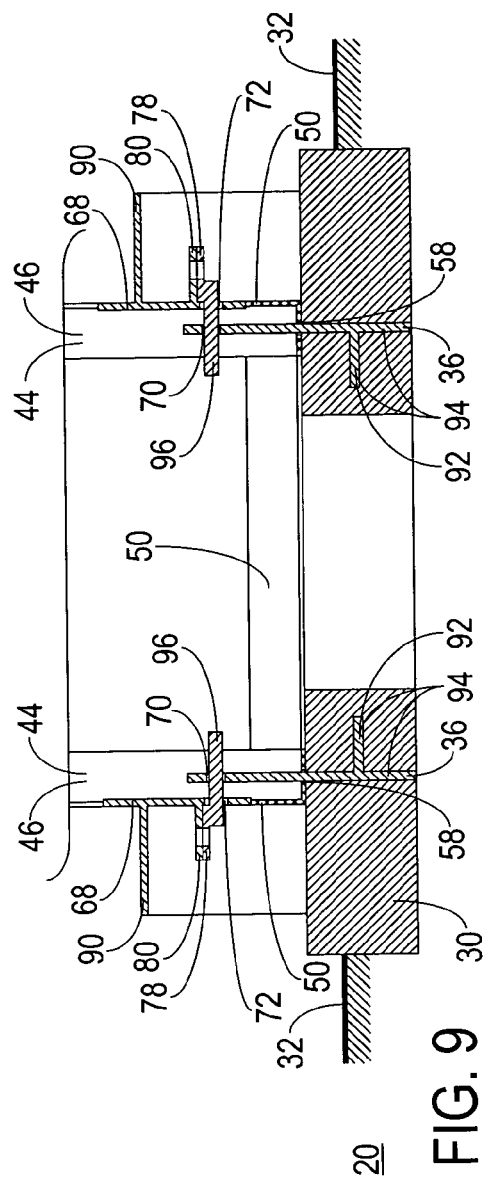
FIG. 9 depicts a cross-sectional side view of a portion of a security enclosure with body and end panels removed and demonstrating a dual-lock enclosure in accordance with an alternative preferred embodiment of the present invention.
Figure 10:
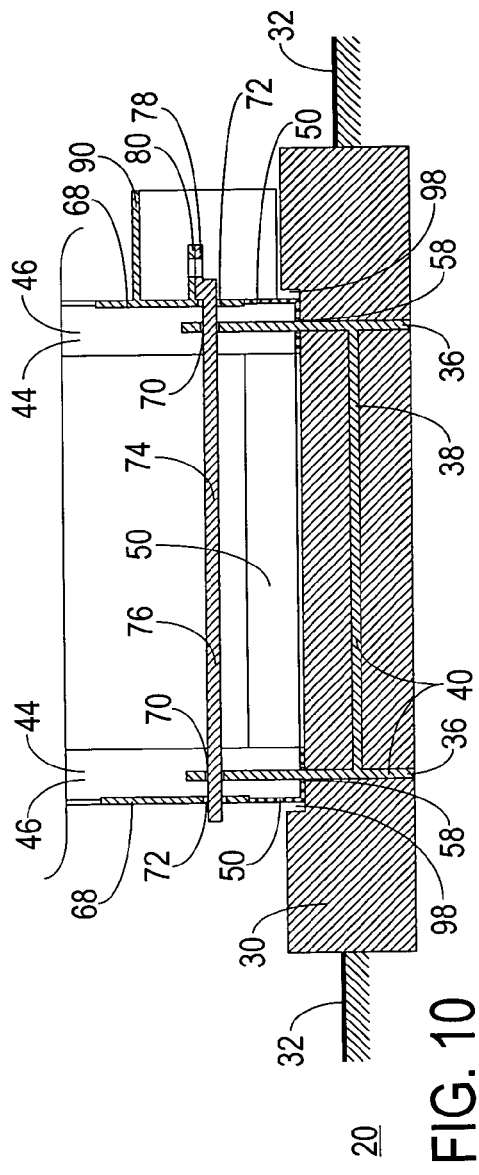
FIG. 10 depicts a cross-sectional side view of a portion of a security enclosure with body and end panels removed and demonstrating a base having a well in accordance with another alternative preferred embodiment of the present invention.

Alternatively, strap engagement slots 58 may be in the pair of opposing angle members 50 affixed between upright portions 46 of each "U" member 44. In this case, each lock plate 68 is affixed to each of those angle members 50, to end panel 26, and to both upright portions 46 of each "U" member 44. This embodiment is depicted in FIGS. 9 and 10 (discussed hereinafter).

It will be understood that the location of strap engagement slots 58 and lock plates 68 is a function of the shape, dimensions, and function of enclosure 20, and of the nature of apparatus 22 to be protected. Placing strap engagement slots 58 at any required location does not depart from the spirit of the present invention.

Each of mounting straps 36 has a strap lock hole 70 proximate its free end. Strap lock holes 70 of each mounting strap 36 are substantially aligned so that a rod placed through both strap lock holes 70 would be substantially parallel to base 30.

Each of lock plates 68 has a cage lock hole 72. Cage lock holes 72 are positioned so that when cage 28 is connected to base 30 and encompasses apparatus 22, cage lock holes 72 are substantially aligned with strap lock holes 70, i.e., a rod may be placed through all four lock holes 72 and 70.

Enclosure 20 includes a lock device 74 consisting of a lock rod 76 and a lock tab 78. Cage 28 is secured to base 30 by inserting lock rod 76 through cage and strap lock holes 72 and 70. Lock rod 76 then prevents cage 28 from being lifted away from base 30 and therefore secures apparatus 22 within cage 28. In the preferred embodiment, lock rod 76 is a cold-rolled steel rod approximately ½" in diameter, thereby providing a significant deterrent to dislodgment of cage 28.

Lock tab 78 is a "movable" lock tab inasmuch as lock device is movable relative to cage 28. Another lock tab 80, a "fixed" lock tab, is affixed to lock plate 68 proximate cage lock hole 72.

Lock tabs 78 and 80 have tab holes 82 and 84, respectively. When lock rod 76 is fully inserted within cage and strap lock holes 72 and 70, lock tabs 78 and 80 are in close proximity and tab holes 82 and 84 are in alignment.

Lock tabs 78 and 80 serve as the "staples" of a locking assembly. A shackle 86 of a lock 88 (FIG. 5) is passed through tab holes 82 and 84 in lock tabs 78 and 80 to secure lock device 74 and secure cage 28 in position residing on base 30. In the preferred embodiment, lock tabs 78 and 80 are formed of 3/16" steel stock to further increase the security of apparatus 22 when encompassed by cage 28. Those skilled in the art will appreciate that lock tabs 78 and 80 may be formed of other materials and/or have other dimensions without departing from the spirit of the present invention.

To secure and protect lock 88 and lock tabs 78 and 80, a shroud 90 is affixed to lock plate 68. Shroud 90, in conjunction with base 30, limits access to lock 88 and lock tabs 78 and 80 to only one direction. This serves to limit the ability of an attacker to gain access to lock 88 and lock tabs 78 and 80 with a cutter or other tool of sufficient strength to cut shackle 86 or lock tabs 78 or 80. To provide this protection, shroud 90 is formed to provide coverage on three sides (top, left, and right, as facing shroud 90), while base 30 itself provides coverage on a fourth side (bottom). In the preferred embodiment, shroud 90 is formed of ⅛" steel stock. Those skilled in the art will appreciate that other materials and/or thicknesses may be used without departing from the spirit of the present invention.

FIG. 9 depicts a cross-sectional side view of a portion of security enclosure 20 analogous to FIG. 3 but demonstrating a dual-lock version in accordance with an alternative preferred embodiment of the present invention. The following discussion refers to FIGS. 3 and 9.

Mounting shank 38 passes between piping 34 or other components of apparatus 22 to join mounting straps 36 and form "H" mounting member 40. In an alternative embodiment, apparatus 22 (FIG. 4) may have a central pipe or other component that prevents the use of mounting shank 38. That is, mounting shank 38 would have to pass through apparatus 22. In such an embodiment, mounting shank 38 is replaced by a short casting member 92 affixed to each mounting strap 36.

When base 30 is cast, casting member 92 serves to provide a strong, non-retractable bond between base 30 and each of mounting straps 36.

Because apparatus 22, has a central component, lock device 74 with lock rod 76 passing through cage 28 cannot be used. Instead, two modified lock devices 94 having short lock bars 96 are used. This necessitates two fixed lock tabs 80, two locks 88, and two shrouds 90.

Alternatively, two lock devices 74 with lock rods 76 passing through cage 28 may be used if these lock devices 74 are positions so that lock rods 76 "bracket" or otherwise miss the components of apparatus 22. This embodiment is especially useful where apparatus 22 is large and more than two mounting straps are desirable for strength.

FIG. 10 depicts a cross-sectional side view of a portion of security enclosure 20 analogous to FIG. 3 but demonstrating base 30 configured with a well 98 in accordance with another alternative preferred embodiment of the present invention. The following discussion refers to FIGS. 3 and 10.

Base 30 is configured with a well 98. Through the use of well 98, the ability of an attacker to insert a crowbar or other tool between cage 28 and base 30 is severely curtailed.

In another embodiment, not shown, apparatus 22 may be exceptionally large or long, such that a single enclosure 20 would necessarily be of a size awkward to position and remove. In such a case, multiple cages 28 may be abutted end-to-end to form enclose 20 and achieve the require size while still retaining ease of positioning and removal. The abutted ends of such cages 28 would be open (i.e., would lack end panel 26 and angle members 50).

In summary, the present invention teaches security enclosure 20 for fluid-control apparatus 22. Through the use of "U" members 44, enclosure 20 is fabricated with no sharp edges, thereby reducing risk of injury due to falling or striking. Through the use of mounting straps 36 and strap engagement slots 58, cage 28 is attached to base 30 without external hardware. Through the use of braces 52, body panel 24 is made resistant to being bashed in or otherwise deformed by being struck. Through the use of shroud 90, the locking mechanism is protected from attack by cutters or other tools.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A security enclosure for a control apparatus, said enclosure comprising:
   a base;
   a cage configured to connect to said base and encompass said apparatus;
   a mounting member comprising:
      a mounting shank embedded within said base; and
      a mounting strap, having a strap width and a strap thickness, said mounting strap partially embedded within said base and joined to said mounting shank; and
   a lock device configured to secure said cage to said mounting strap when said cage is connected to said base;
   wherein:
      said cage has a strap engagement slot having a slot width greater than said strap width and a slot thickness greater than said strap thickness; and
      said mounting strap is configured to extend inside said cage substantially vertically and perpendicular to said base through said strap engagement slot when said cage is connected to said base.

2. An enclosure as claimed in claim 1 wherein:
said mounting strap is a first mounting strap;
said lock device is a first lock device; and
said enclosure additionally comprises:
- a second mounting strap configured to extend inside said cage substantially perpendicular to said base when said cage is connected to said base; and
- a second lock device configured to secure said cage to said second mounting strap when said cage is connected to said base.

3. An enclosure as claimed in claim 1 wherein:
said cage has a cage lock hole and comprises a fixed lock tab having a tab hole;
said mounting strap has a strap lock hole; and
said lock device is configured to reside within said cage and strap lock holes when said cage is connected to said base, and comprises a lock rod and a movable lock tab having a tab hole;
said lock rod is configured to reside within said cage and strap lock holes with said fixed and movable tab holes substantially in alignment when said cage is connected to said base.

4. An enclosure as claimed in claim 1 wherein:
said lock device comprises:
a movable lock tab; and
a lock rod; and
said enclosure additionally comprises:
a fixed lock tab coupled to said cage;
a shroud configured to enshroud said fixed and movable lock tabs when said cage is connected to said base.

5. A security enclosure for a control apparatus, said enclosure comprising:
a base;
a cage configured to connect to said base and encompass said apparatus;
a mounting member comprising:
- a pair of mounting straps, wherein each of said mounting straps is partially embedded within said base and has a strap lock hole; and
- a mounting shank embedded within said base, and extending between and joined to each of said mounting straps;
a fixed lock tab affixed to said cage and having a tab hole;
a lock device comprising:
- a movable lock tab having a tab hole; and
- a lock rod coupled to said movable lock tab; and
a shroud configured to enshroud, in conjunction with said base, said fixed lock tab, said movable lock tab, and a lock having a shackle passing through said tab holes of said fixed and movable lock tabs when said cage is connected to said base.

6. An enclosure as claimed in claim 5 wherein:
said enclosure additionally comprises a lock plate coupled to said cage and having a cage lock hole;
each of said mounting straps is partially embedded within said base and configured to extend inside said cage substantially perpendicular to said base so that said strap lock hole substantially aligns with said cage lock hole when said cage is connected to said base; and
said lock rod is configured to reside within said cage and strap lock holes when said cage is connected to said base.

7. An enclosure as claimed in claim 6 wherein:
said shroud is coupled to said lock plate;
said shroud enshrouds said fixed lock tab, said movable lock tab, and said lock upon three sides; and
said base enshrouds said fixed lock tab, said movable lock tab, and said lock upon a fourth side.

8. An enclosure as claimed in claim 5 wherein:
each of said mounting straps is partially embedded within said base and configured to extend inside said cage substantially perpendicular to said base when said cage is connected to said base; and
said lock rod is configured to couple said cage to each of said mounting straps.

9. An enclosure as claimed in claim 8 wherein:
a first one of said pair of mounting straps has a first strap lock hole;
a second one of said pair of mounting straps has a second strap lock hole substantially aligned with said first strap lock hole;
said cage comprises a first lock plate having a first cage lock hole;
said cage additionally comprises a second lock plate having a second cage lock hole substantially aligned with said first cage lock hole and, when said cage is connected to said base, substantially aligned with said first and second strap lock holes; and
said lock rod is configured to reside in said first and second cage lock holes and said first and second strap lock holes when said cage is connected to said base.

10. A security enclosure for a fluid-control apparatus, said enclosure comprising:
a cage connected to a base and configured to encompass said apparatus, said cage comprising:
- a first "U" member;
- a second "U" member;
- a first angle member coupled between said first and second "U" members and having a first strap engagement slot;
- a second angle member coupled between said first and second "U" members and having a second strap engagement slot;
- a first lock plate coupled between said first and second "U" members and having a first cage lock hole;
- a second lock plate coupled between said first and second "U" members and having a second cage lock hole substantially aligned with said first cage lock hole
- a fixed lock tab proximate said first cage lock hole and having a tab hole;
- a first end panel coupled to said first "U" member;
- a second end panel coupled to said second "U" member;
- a perforated body panel coupled between said first and second "U" members; and
- a brace coupled between said first and second "U" members;
a mounting member comprising:
- a first mounting strap partially embedded within said base, configured to extend inside said cage substantially perpendicular to said base through said first strap engagement slot, and having a first strap lock hole configured to substantially align with said first and second cage lock holes;
- a second mounting strap partially embedded within said base, configured to extend inside said cage substantially perpendicular to said base through said second strap engagement slot, and having a second strap lock hole configured to substantially align with said first strap lock hole and with said first and second cage lock holes; and
- a mounting shank embedded within said base and joined to said first and second mounting straps;

a lock device configured to secure said cage to said first and second mounting straps, said lock device comprising:
a movable lock tab having a tab hole; and
a lock rod coupled to said movable lock tab and configured to reside within said first cage lock hole, said first strap lock hole, said second strap lock hole, and said second cage lock hole so as to align said tab holes of said fixed and movable lock tabs; and a shroud coupled to said first lock plate and configured to enshroud, in conjunction with said base, said fixed lock tab, said movable lock tab, and a lock having a shackle passing through said tab holes of said fixed and movable lock tabs.

* * * * *